United States Patent
Furuya et al.

(10) Patent No.: US 8,479,485 B2
(45) Date of Patent: Jul. 9, 2013

(54) SYNTHETIC FIBER ROPE MEMBER, OVERHEAD DOOR HAVING THE SAME AND METHOD FOR PRODUCING ROPE MEMBER

(75) Inventors: Okitsugu Furuya, Shinjuku-ku (JP); Akira Matsuzaka, Machida (JP); Kazuya Noguchi, Kawasaki (JP); Masanori Funayama, Nasushiobara (JP)

(73) Assignee: Kongo Corporation, Tokyo (JP)

( * ) Notice: Subject to any disclaimer, the term of this patent is extended or adjusted under 35 U.S.C. 154(b) by 180 days.

(21) Appl. No.: 12/971,732

(22) Filed: Dec. 17, 2010

(65) Prior Publication Data

US 2011/0214351 A1    Sep. 8, 2011

(30) Foreign Application Priority Data

Mar. 3, 2010  (JP) ................................. 2010-046125
Jun. 29, 2010  (JP) ................................. 2010-147148

(51) Int. Cl.
  *D02G 3/36* (2006.01)
(52) U.S. Cl.
  USPC .......................................................... 57/258
(58) Field of Classification Search
  USPC ................................ 57/22, 202, 250, 257, 258
  See application file for complete search history.

(56) References Cited

U.S. PATENT DOCUMENTS

| | | | | |
|---|---|---|---|---|
| 2,983,976 A * | 5/1961 | Ehmann | ........................ | 403/212 |
| 3,067,570 A * | 12/1962 | Nischan | ........................... | 57/202 |
| 3,118,273 A * | 1/1964 | Lucht | ............................... | 57/202 |
| 3,190,065 A * | 6/1965 | Little | ............................... | 57/212 |
| 4,114,360 A * | 9/1978 | Emmons | .......................... | 57/202 |
| 4,242,777 A * | 1/1981 | Bourard et al. | ............. | 24/115 A |
| 4,457,959 A * | 7/1984 | Dornheim et al. | ............ | 427/379 |
| 6,089,008 A * | 7/2000 | Lucius | ............................. | 57/25 |
| 6,493,910 B1 * | 12/2002 | Dischler | ......................... | 24/712 |
| 7,331,269 B2 * | 2/2008 | He et al. | ............................. | 87/6 |
| 2003/0005681 A1 * | 1/2003 | He et al. | .......................... | 57/210 |

FOREIGN PATENT DOCUMENTS

| | | |
|---|---|---|
| JP | A-53-114950 | 10/1978 |
| JP | A-54-64254 | 5/1979 |
| JP | A-54-96653 | 7/1979 |

(Continued)

OTHER PUBLICATIONS

Notice of Reasons for Rejection for corresponding Japanese Patent Application No. 2010-147148, mailed on Aug. 31, 2010, (w/ English translation).

(Continued)

*Primary Examiner* — Shaun R Hurley
(74) *Attorney, Agent, or Firm* — Oliff & Berridge, PLC

(57) ABSTRACT

There is provided a method for producing a rope member, provided with a rope of a bundle of synthetic fibers and a clamping member fixed to the rope and forming a portion with which the rope is to be connected or fastened to an external member, wherein a filler having permeability to the rope and containing a liquid and particles of an inorganic material dispersed in the liquid is made to permeate into a part of the rope, and the clamping member is fixed to the rope by installing the clamping member to cover the part of the rope permeated with the filler and by tightening the clamping member. The liquid is evaporated and only the inorganic material particles remain between the fibers of the rope. The clamping member is prevented from slippage even when a high load is applied to the synthetic fiber rope having high tensile force.

13 Claims, 10 Drawing Sheets

FOREIGN PATENT DOCUMENTS

| | | |
|---|---|---|
| JP | U-54-116635 | 8/1979 |
| JP | A-1-97285 | 4/1989 |
| JP | A-5-115117 | 5/1993 |
| JP | A-5-247862 | 9/1993 |
| JP | A-2000-234284 | 8/2000 |
| JP | A-2004-277922 | 10/2004 |
| JP | A-2010-43366 | 2/2010 |

OTHER PUBLICATIONS

Notice of Reasons for Rejection for corresponding Japanese Patent Application No. 2010-147148, mailed on Oct. 19, 2010 (w/ English translation).

* cited by examiner

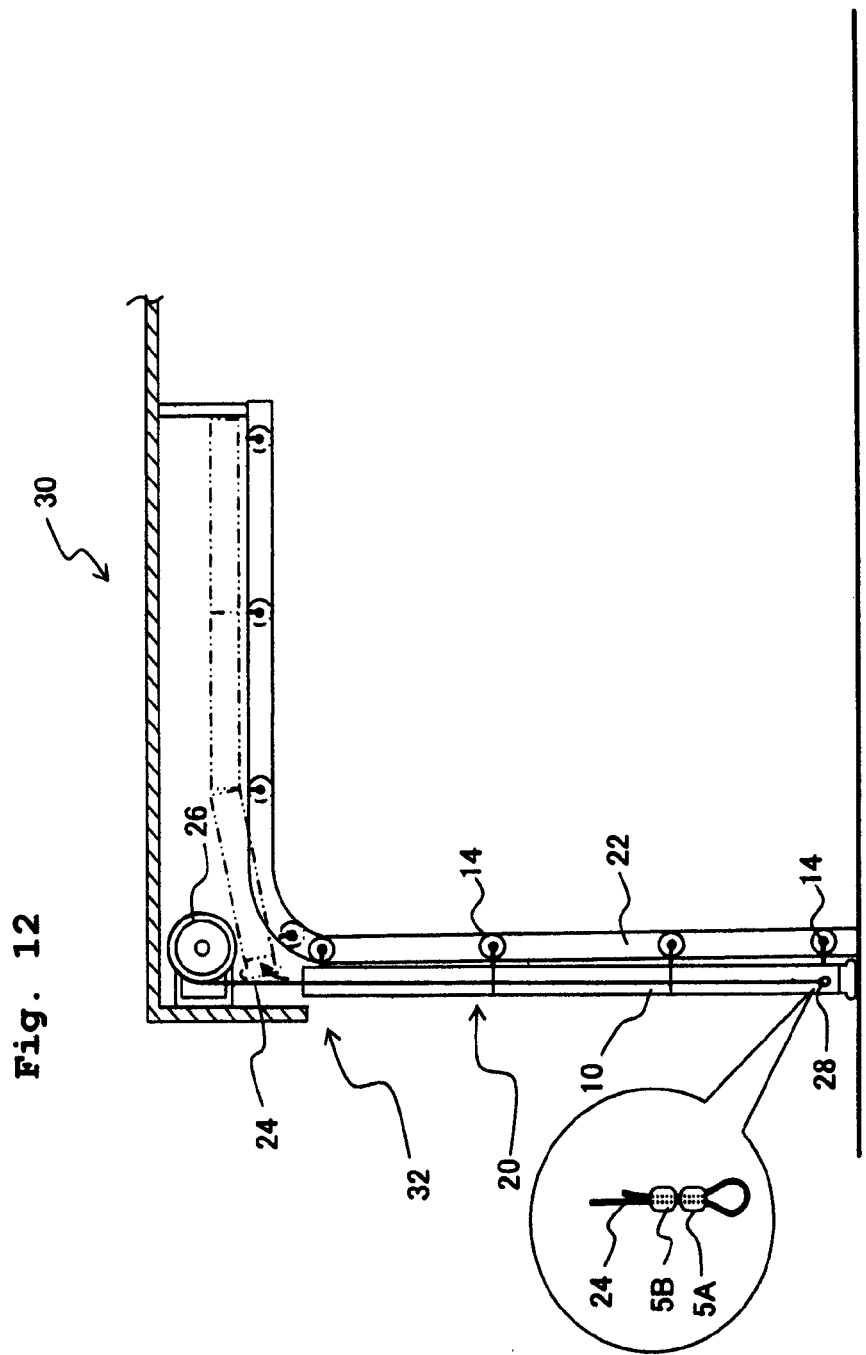

SYNTHETIC FIBER ROPE MEMBER, OVERHEAD DOOR HAVING THE SAME AND METHOD FOR PRODUCING ROPE MEMBER

BACKGROUND OF THE INVENTION

1. Field of the Invention

The present invention relates to a rope member including a synthetic fiber rope and a clamping member to be used for connecting or fastening the rope to an external member, an overhead door having the rope member, and a method for producing the rope member.

2. Description of the Related Art

In recent years, the improvement has been made for the method of producing synthetic fibers, and it is possible to produce extremely fine fiber strands. By twisting the fiber strands in various shapes, produced are synthetic fiber ropes which are superior or no way inferior to any metal product. The features of such synthetic fiber ropes can be exemplified by light weightness, high tensile strength characteristics, high elasticity, low moisture absorption, abrasion resistance, incision resistance, chemical resistance, etc. Representative synthetic fiber rope materials include those having trade names of Nylon, Tetoron, Cremona, and Vectran (polyarylate fiber). Furthermore, polypropylene is also used as a synthetic fiber rope material. In particular, Vectran can endure the tensile force equivalent to that applied to a metal wire rope having the same diameter.

The synthetic fiber rope as described above is usable in various ways including, for example, in construction machines such as cranes, buildings and structures such as suspension bridges, and hoisting accessories such as those used for overhead door (over door) for the industry use and for the housing equipment. In order to connect the synthetic fiber rope to an external member or apparatus, in general, it is necessary to attach a clamping part 2 (or a terminal) to a terminal end portion 3 of a synthetic fiber rope 1 as shown in FIG. 1 (FIGS. 1A and 1B). More specifically, the clamping part 2 is a sleeve made of metal. The sleeve is caulked by applying a uniform force N from the outside to the circumferential surface of the sleeve. With the clamping part 2 firmly fixed to the rope 1, when a force F is applied to the other end of the synthetic fiber rope 1, the same amount of force F is generated in the opposite direction (see FIG. 2). If it is assumed that the equilibrium state is maintained, the following relational expression holds as a conceptual theoretical expression.

$$F = \mu N \quad (1)$$

In this expression, $\mu$ represents the effective coefficient of static friction between the clamping part 2 and the synthetic fiber rope 1, and N represents the vertical force applied, for example, in accordance with a caulking step.

The following method is available to connect the synthetic fiber rope to the external apparatus. That is, as shown in FIG. 3, a terminal end portion 3 of a synthetic fiber rope 1 is shaped into a "loop" by a clamping member 2 such as a sleeve. The loop portion is connected to a connecting portion of an external apparatus, for example, a hook fixture (or hook metal fixture). When the clamping member 2 is fixed to the terminal portion 3, a method in which the sleeve is caulked as described above is generally used.

Japanese Patent Application Laid-open No. 5-115117 discloses a method in which a wire member formed of twisted wires is inserted into a holding fixture formed with a plurality of helical parts to thereby fix the wire member and the holding fixture to each other. Japanese Patent Application Laid-open No. 5-115117 also describes that a friction enhancing agent may be applied to the inside of the helical parts of the holding fixture. On the other hand, Japanese Patent Application Laid-open No. 5-247862 discloses, as an exemplary conventional method for fixing a metal sleeve and a terminal end portion of a fiber composite soft member, a method in which a thermosetting resin liquid such as those based on an epoxy resin is filled as an adhesive into a space between a metal sleeve and a circumferential surface of the terminal end portion of the fiber composite soft member to impregnate the thermosetting resin liquid into the fiber composite soft member, and then the thermosetting resin liquid is cured to thereby integrally adhere the metal sleeve to the fiber composite soft member. Japanese Patent Application Laid-open No. 2010-43366 discloses a procedure in which a terminal end portion of a rope inserted into a tapered end portion of a metal pipe is impregnated with a curable resin or a viscoelastic gap filler, and a space between the terminal end portion of the rope and the metal pipe is also filled with the curable resin or the viscoelastic gap filler, followed by being cured to form a same shape as that of the taper of the metal pipe around the terminal end portion of the rope.

Japanese Patent Application Laid-open No. 2000-234284 discloses a method for fastening an terminal end portion of a fiber rope in which the terminal end portion of the fiber rope is untwisted (loosened) and inserted into a socket; and a fixing agent or material, prepared by mixing an inorganic powdery material and a thermosetting resin in a predetermined weight ratio, is injected into the interior of the socket and is cured. Japanese Utility Model Publication No. 54-116635 discloses a compression-joining portion of a plastic rope wherein the compression-joining portion is formed by filling rigid particles in a gap or space between a terminal end portion of a plastic rope in which the twist of the plastic rope is untwisted and a sleeve surrounding the terminal end portion, and by compressing the sleeve together with the rigid particles.

Incidentally, the tensile force of the synthetic fiber rope developed in recent years is extremely high as described above. In Vectran, etc. which has a diameter of 4 mm$\phi$, the maximum tensile force F reaches 12 kN (kilonewtons). FIG. 6 shows a result of a tensile strength test performed for Vectran with a loop structure as shown in FIG. 3. As is clearly shown in FIG. 6, a certain proportional elongation is exhibited until the load to Vectran arrives at a certain value. However, when the load arrives at the certain value which exceeds the frictional force between Vectran and the sleeve, the slip phenomenon takes place. This process is repeated, and the maximum value of the tensile force F cannot exceed a certain value any more.

In order to increase the tensile force F, it is conceived that two clamping parts 2 are used in the extending direction of the rope (see FIG. 4). However, according to an experiment performed by the inventors of the present invention, the maximum tensile load value is merely increased 1.5 to 2 times as compared with a case in which one clamping part 2 is used, as shown in FIG. 6 for the result of the tensile strength test. The slip phenomenon still exists, and it is impossible to greatly increase the maximum tensile force F. More specifically, the slip phenomenon takes place at about ⅓ of the maximum tensile force of Vectran when one sleeve is used, and at about ½ of the maximum tensile force of Vectran when two sleeves are used, therefore not possible to sufficiently endure the load and/or the stress exerted by the external apparatus. The phenomenon as described above arises in the same manner not only with Vectran but also any other high tensile force synthetic fiber rope. Currently, there exists no effective method of reliably fixing a clamping member to a terminal end point of a synthetic fiber rope, nor any suitable clamping member. Even though any synthetic fiber rope having a high tensile force is developed, such a rope cannot be utilized as a part of an actual mechanical structure in actual circumstances. In the structures disclosed in Japanese Patent Application Laid-open No. 2000-234284 and Japanese Utility Model Publication No. 54-116635 respectively, it is necessary that the end portion of the rope is untwisted, requiring labor and time, and that thermosetting resin and a large amount of the rigid particles have to be charged inside the sleeve, increasing the cost.

SUMMARY OF THE INVENTION

The present invention is to solve the problem as described above so that the high tensile force of the synthetic fiber rope is effectively used, an object of the present invention is to provide a rope member in which a clamping member is reliably fixed to a synthetic fiber rope, an overhead door having the rope member, and a method which makes it possible to easily produce such a rope member.

According to the first aspect of the present invention, there is provided a method for producing a rope member provided with a rope of a bundle of synthetic fibers and a clamping member fixed to the rope and forming a portion with which the rope is to be connected or fastened to an external member, the method including: making a filler permeate into a part of the rope, the filler having a permeability to the rope and containing a liquid and particles of an inorganic material dispersed in the liquid; evaporating the liquid from the rope; and fixing the clamping member to the rope by installing the clamping member so as to cover the part, of the rope, permeated with the filler and by tightening the clamping member.

The present invention is based on the following findings by the inventors. As described above, the problem of slippage is caused when the synthetic fiber rope such as Vectran, which has the high tensile force, is connected to the external apparatus. It is considered that this problem is caused because the effective coefficient of static friction μ is small between the clamping part 2 and the synthetic fiber rope 1 for F being extremely large. The inventors diligently and carefully investigated this problem and have discovered the cause of the problem lying in the structure and the high tensile force of the synthetic fiber rope. The synthetic fiber rope is constructed by stranding (twisting) a large number of synthetic fibers. However, gaps are originally present between the fibers. When an extremely large tensile force is applied to the synthetic fiber rope having the high tensile strength, the gaps (voids, spaces) between the fibers are reduced, and then the fibers get closer to each other. Further, the cross-sectional areas of the respective fibers are decreased to some extent in accordance with the extension. As a result of the decrease in the cross-sectional areas of the respective fibers and the reduction of the voids (and the fibers getting closer to each other), the cross-sectional area of the entire synthetic fiber rope is substantially decreased. Therefore, the friction between the outermost surface of the rope and the clamping member, i.e., the effective coefficient of static friction μ is decreased, resulting in the slippage between the clamping part 2 and the synthetic fiber rope 1. That is, the feature of the high tensile force (and the high elasticity), which is the biggest advantage of the synthetic fiber, causes the decrease in effective coefficient of static friction μ when the connection is made to the external apparatus. In the production method of the present invention, the filler which has the permeability to the rope and in which the particles of the inorganic material are dispersed in the liquid is made to permeate (penetrate) into a part of the rope, and the clamping member is installed so that the clamping member covers the part of the rope into which the filler is permeated, and the clamping member is tightened. That is, as shown in FIG. 1B, the particles of the inorganic material, which are contained in the filler 4, are charged so that the voids 1c between the fibers 1b are filled therewith. Therefore, even when the high tensile force is applied, the cross-sectional area of the rope is not substantially reduced, and it is possible to suppress the disengagement of the sleeve.

According to the second aspect of the present invention, there is provided a rope member including: a rope formed by twisting synthetic fibers; and a clamping member fixed to the rope and forming a portion with which the rope is to be connected or fastened to an external member; wherein spaces between the twisted synthetic fibers, disposed at a portion of the rope at which the clamping member is attached, are filled with only particles of an inorganic material.

According to the third aspect, there is provided an overhead door including the rope member of the invention, and a door to which an end portion of the rope member is attached.

According to the present invention, by making the filler, which is composed of the particles of the inorganic material dispersed in the liquid, permeate into the terminal end portion of the synthetic fiber rope, it is possible to increase the value of the effective coefficient of static friction μ in the expression (1) described above. Therefore, according to this theoretical expression, the external force F is increased by an amount corresponding thereto with respect to the same clamping vertical force N applied from the side surface. That is, if the effective coefficient of static friction μ can be increased twice by making the filler to penetrate (permeate), the synthetic fiber rope can be used without causing any slippage up to 12 kN (kilonewtons), otherwise the slippage has been hitherto caused at 6 kN (kilonewtons) (see FIG. 7). Therefore, it is possible to enhance the strength and safety of the device or equipment such as the overhead door using the rope member of the present invention.

In the present invention, the clamping member is prevented from the slippage merely by penetration or permeation of the filler of liquid form in which the particles of the inorganic material are dispersed in the liquid, without greatly changing the conventional method for manufacturing the clamping portion disposed at the terminal end portion of the rope. Therefore, it is possible to produce the synthetic fiber rope member conveniently and inexpensively. Compared to a conventional method of untwisting or loosening the twistings of the rope, and applying (charging) the thermosetting resin between the fibers of the rope, the manufacturing operation of the present invention is easier where the loop shape is readily formed. Furthermore, the production operability and the outer appearance of the synthetic fiber rope member are better than those of an adhesive being used.

BRIEF DESCRIPTION OF THE DRAWINGS

FIG. 8 (FIGS. 8A, 8B) shows magnified photographs of the rope member before a metal sleeve is inserted in Example 1, wherein

FIG. 12 is a drawing schematically illustrating a construction of an overhead door using the synthetic fiber rope made in Example 6.

DESCRIPTION OF THE PREFERRED EMBODIMENTS

Figure 1A:
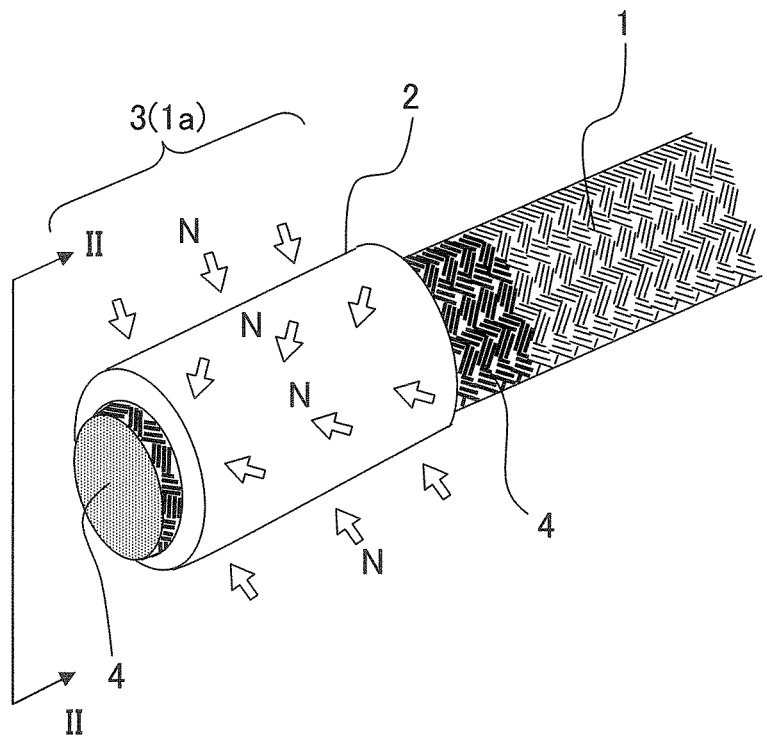
FIG. 1 (FIGS. 1A, 1B) shows a perspective view illustrating those disposed in the vicinity of a terminal end portion of a synthetic fiber rope member in which a filler is allowed to penetrate into the terminal end portion of the synthetic fiber rope and a sleeve is fixed thereon, as an embodiment of the present invention.
Figure 1B:
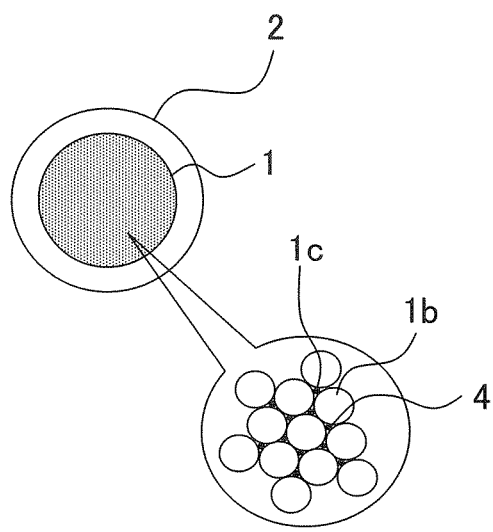
Figure 2:
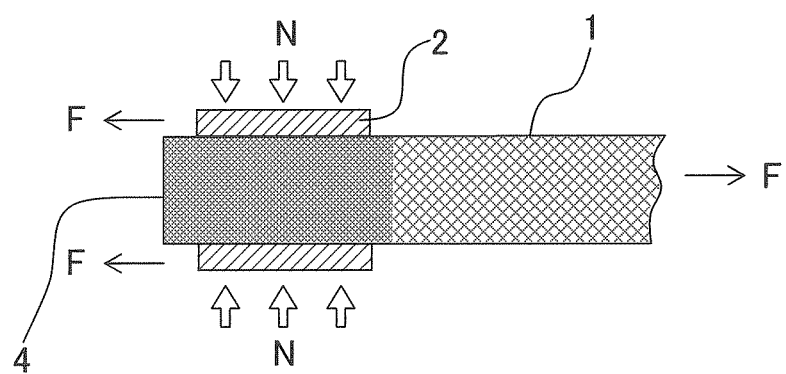
FIG. 2 shows a sectional view taken in a direction II-II, illustrating the synthetic fiber rope member shown in FIG. 1.

An embodiment of the synthetic fiber rope member of the present invention and the method for producing the same will be explained with reference to FIGS. 1 and 2. The synthetic fiber rope member of the present invention has a synthetic fiber rope 1 and a clamping member (terminal) 2 which is fixed to a part thereof, for example, a terminal end portion or the vicinity thereof. A filler 4, which is composed of particles of an inorganic material dispersed in a liquid, is charged (permeated) into a portion (fixed portion) 1a of the synthetic fiber rope 1 to which the clamping member 2 is fixed. Namely, the filler (inorganic material particles) is allowed to intervene (penetrate) between the fibers of the fixed portion 1a of the synthetic fiber rope 1; and the filler is allowed also to intervene (penetrate) between the surface (of the fibers) of the fixed portion 1a and the clamping member 2. The respective materials constructing the synthetic fiber rope member as described above will be explained below.

The synthetic fiber rope 1, which is used for the synthetic fiber rope member, is a bundle of synthetic fibers or a rope obtained by stranding synthetic fibers. The synthetic fibers include, for example, nylon (trade name), Tetoron (trade name), Cremona (trade name), and Vectran (trade name) as well as polypropylene fibers. Among the synthetic fibers, those having the tensile strength of not less than 250 kgf/mm$^2$ tend to slip when the conventional clamping member is used, and therefore are suitable for the application of the present invention. In particular, Vectran can endure the tensile force or the load equivalent to that endured by a metal wire rope having the same thickness, whereas Vectran exhibits the slip phenomenon as described in the section of the background of the present invention. Therefore, Vectran is one of the preferable targets for use of the present invention. Vectran is formed of polyarylate fibers. For example, the tensile strength is not less than 6 kN in the case of Vectran of φ=4 mm. The diameter of the synthetic fiber rope 1 is properly selected depending on the way of use. For example, Vectran of φ0.5 mm to 80 mm is available.

Those usable as the clamping member 2 include, for example, a metal sleeve, a ring, and a tape composed of a metal or a synthetic fiber material; and any one of them can be permanently caulked or attached to the rope under pressure. The metal sleeve is not only limited to circular shape, but also to those having arbitrary cross-sectional shapes including, for example, elliptical and rectangular shapes. It is possible to use commercially available sleeves made of aluminum or copper. The inner diameter of the sleeve is appropriately selected depending on the outer diameter of the synthetic fiber rope 1 to be inserted thereinto. The length of the sleeve is generally 10 to 22 mm.

The clamping member 2 is attached (fixed) to the terminal end portion of the synthetic fiber rope 1 or the vicinity thereof. However, the attachment position is not specifically limited. The attachment position of the clamping member 2 to the synthetic fiber rope 1 and the attachment method thereof are properly selected depending on the connecting method or the fastening method with respect to the external apparatus. For example, in a case that the terminal end portion of the synthetic fiber rope 1 is folded back to form a loop, the clamping member 2 is attached so that the synthetic fiber rope 1 are folded back so as to make portions of the synthetic fiber rope 1 overlap with each other, i.e., the clamping member 2 is attached to the two overlapped portions of the synthetic fiber rope 1 (see FIGS. 3 to 5). A protrusion or a hook (any one of them is not shown), which is provided for the external apparatus, is inserted into the loop formed as described above, and thus the external apparatus and the rope member are connected to each other. Alternatively, as shown in FIG. 1A, it is also allowable that the clamping member 2 is attached to the terminal end portion or the vicinity thereof without folding back the synthetic fiber rope 1. In this case, a groove or a hole, which has a width greater than the outer diameter of the synthetic fiber rope 1 and smaller than the outer diameter of the clamping member 2, is provided for the external apparatus; and the synthetic fiber rope 1 is inserted into the groove or the hole as described above, and the clamping member 2 is fastened by a wall portion which defines the groove or the hole. By doing so, the rope member can be connected to the external apparatus. However, the method for connecting the rope member and the external apparatus is not limited, and it is possible to use any arbitrary method as long as the feature of the rope member of the present invention is applied.

The filler 4 is charged into a portion (attachment portion) of the synthetic fiber rope 1 to which the clamping member 2 is attached. As a result, the filler 4 exists while permeating (penetrating) into the spaces between the fibers constructing the synthetic fiber rope 1. The following advantage is obtained owing to the existence of the filler while arriving at the spaces between the fibers. The voids originally existing between the fibers of the synthetic fiber rope are narrowed when a high tensile force is applied. As a result, the cross-sectional area of the rope is substantially decreased, and the clamping member such as the sleeve or the like tends to be disengaged from the rope. On the other hand, when the filler is charged (exists) so that the voids between the fibers are filled therewith, the cross-sectional area of the rope is not substantially reduced even if the high tensile force is applied, and the disengagement of the sleeve is prevented. Owing to the filler existing between the fibers and on the surfaces of the fibers, the friction between the fibers is increased, and the friction between the fibers and the clamping member 2 is increased. It is considered that the effect of suppressing the change of the cross-sectional area of the synthetic fiber rope 1 and the effect of increasing the friction between the synthetic fiber rope 1 and the clamping member, which are provided as described above, are combined synergistically with each other so that the clamping member 2 is prevented from the slip movement from the synthetic fiber rope 1 and thus the improvement is made regarding the loading capability at which the slip phenomenon is caused. According to the fact as described above, the present invention is effectively applied to the synthetic fiber having the high tensile force. The present invention is extremely effective for the synthetic fiber rope having the high tensile force in which the tensile strength is not less than 250 kgf/mm$^2$.

As for the filler 4, a liquid which has the permeability and in which the inorganic material particles are dispersed is used. In this case, because the liquid having the permeability is permeated (penetrated) into the spaces between the fibers of the synthetic fiber rope 1, the liquid acts as a transporter of the inorganic material particles to the spaces between the fibers or the surfaces of the fibers. The liquid, which has the permeability with respect to the synthetic fiber rope, is dried and evaporated. Accordingly, only the inorganic material particles remain between the fibers or on the surfaces of the fibers. In this viewpoint, an organic solvent which has the volatile property (which is easily evaporated), which includes, for example, ethanol and acetone, is advantageously used as the liquid having the permeability.

Those usable as the inorganic material particles include silica, kaolinite (kaoline, dickite, or nackrite: $Si_2O_3 \cdot Al_2O_3$), alumina ($Al_2O_3$), zirconium dioxide ($ZrO_2$), titanium dioxide ($TiO_2$), silicon carbide (SiC), etc. The inorganic materials are commercially available. In some cases, however, a slight amount of impurity (up to about several %) is contained due to the conditions of the production process and the purification. However, it is also allowable that such an impurity is contained in the inorganic material and that the impurity does not pose any problem even if the impurity becomes a part of the inorganic material, provided that the filler to be used provides the function of the present invention. Among the inorganic materials as described above, it is especially preferable to use silica or alumina in view of, for example, the availability and the durability against the chemicals and the environment. The particle size of silica is preferably 0.5 μm to 2.0 μm in consideration of the dispersibility in the dispersion medium (dispersion liquid) and the permeability into the spaces between the fibers.

The filler 4 can be prepared by mixing and dispersing the inorganic material particles described above in a liquid having the permeability. The mixing ratio can be determined depending on the average particle size of the inorganic material particles, the thickness of the fibers constructing the rope, the gaps or voids between the fibers, etc.

In the following, explained is a method for fixing the clamping member 2 to the synthetic fiber rope 1 and a method for producing the synthetic fiber rope member. The filler is penetrated (permeated) into a portion disposed in the vicinity of the terminal end portion of the synthetic fiber rope 1 which is obtained by stranding (twisting) the synthetic fibers (which consists of stranded and twisted synthetic fibers) as described above. The filler is prepared with the inorganic material particles such as a silica powder mixed and dispersed at a predetermined ratio in a liquid having the permeability with respect to the synthetic fiber rope, for example, a volatile liquid such as ethanol or the like as described above. The filler prepared as described above is coated onto or applied to the portion disposed in the vicinity of the terminal end portion of the synthetic fiber rope 1. When coating the filler onto the portion disposed in the vicinity of the terminal end portion of the synthetic rope 1, there is no need to loosen the twisting (untwisting back to the fibers) of the end portion of the rope 1. Alternatively, the portion disposed in the vicinity of the terminal end portion of the synthetic fiber rope 1 may simply be immersed in the filler liquid. After the filler is thoroughly penetrated (permeated) into the spaces between the fibers in the vicinity of the terminal end portion of the synthetic fiber rope 1 by applying the filler to the terminal end portion of synthetic fiber rope 1 or immersing the terminal end portion in the filler liquid, the drying process is performed therefor. The drying is performed until the dispersion liquid (dispersion medium) is volatilized (evaporated). Subsequently, the portion of the synthetic fiber rope 1 into which the filler liquid has been charged (penetrated) is inserted into and covered with the clamping member 2 such as the metal sleeve or the like. Subsequently, the pressure is applied to the side surface (circumferential surface) of the clamping member 2 such as the metal sleeve or the like, and the clamping member 2 is permanently tightened and fixed (caulked) with respect to the synthetic fiber rope 1. The caulking pressure may be, for example, 420 to 450 kgf/cm$^2$. Thus, the clamping member 2 is fixed to the synthetic fiber rope 1, and the synthetic fiber rope member is completed. An alkyl α-cyanoacrylate-based adhesive may be further charged (applied) from the space between the clamping member 2 and the synthetic fiber rope 1 after caulking the clamping member 2 so as to make the adhesive penetrate into the synthetic fiber rope 1.

Example 1

Figure 8A:
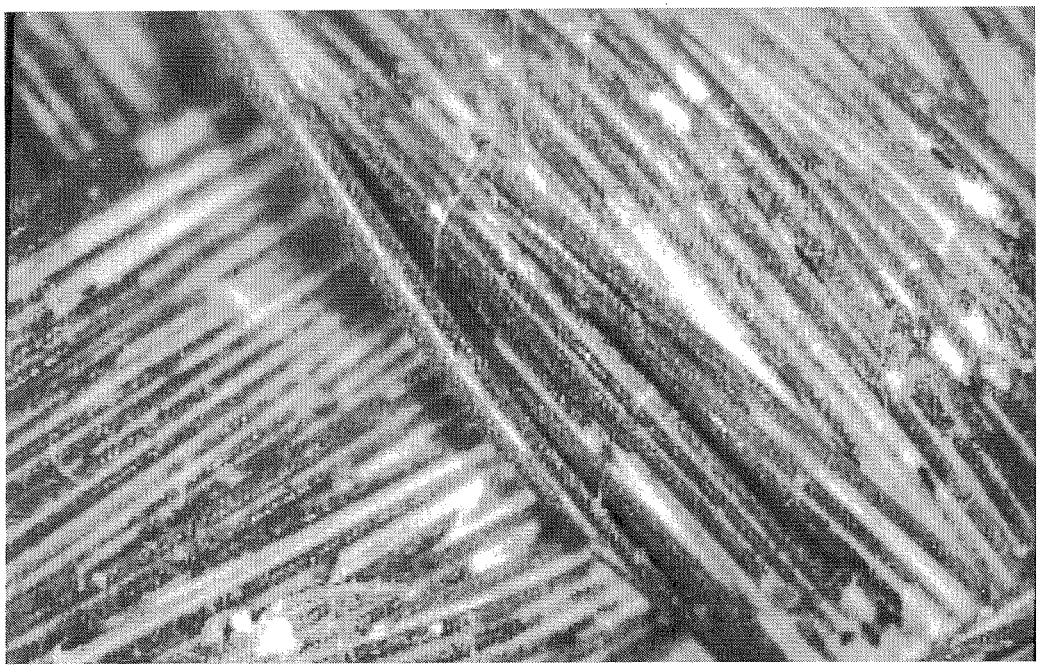
FIG. 8A shows a magnified photograph of a surface of the rope member.
Figure 8B:
FIG. 8B shows a magnified photograph of the interior (surface of a cross section) thereof.

Vectran HT (produced by Kuraray, length: 450 mm, φ=4 mm) was used as a synthetic fiber rope. A dispersion liquid, in which a silica ($SiO_2$) powder was dispersed in ethanol, was used as a filler. A sleeve (inner diameter=4.5 mm, length=20 mm) made of aluminum, which had a circular cross section, was used as a clamping member. The filler was prepared by well mixing and agitating the silica powder (average particle size of about 0.8 μm) at a volume ratio of 1:1 with ethanol. A terminal end portion of the synthetic fiber rope was immersed for 20 seconds in the filler so that the filler containing the silica powder was sufficiently penetrated (permeated) into the spaces between fibers of the rope. The drying process was performed until ethanol was evaporated, and then the metal sleeve was inserted into the terminal end portion of the synthetic fiber rope. A substantially uniform vertical force N (P=about 420 kgf/cm$^2$ (41.9 MPa)) was applied from the side surface of the sleeve to fix the sleeve to the synthetic fiber rope (caulking step). In this way, the rope member was obtained, in which the sleeve 2 was fixed to the synthetic fiber rope 1 as shown in FIG. 1A. FIGS. 8A and 8B respectively show magnified photographs of the surface and the interior (cross-sectional surface) of the rope member before inserting the metal sleeve. From the photographs, it is clearly seen that the silica powder is adhered to the fiber surfaces and the spaces between the fibers constructing the rope member. The synthetic fiber rope is hardly different visually from a regular synthetic fiber rope to which the filler is not applied.

Example 2

A rope member was produced in the same manner as in Example 1 except that an alkyl α-cyanoacrylate-based adhesive was penetrated (permeated) into the space between the metal sleeve and the synthetic fiber rope after the caulking step. The alkyl α-cyanoacrylate-based adhesive may be penetrated into the terminal end portion of the synthetic fiber rope after drying the dispersion liquid of silica/ethanol and before the caulking step.

Example 3

Figure 3:
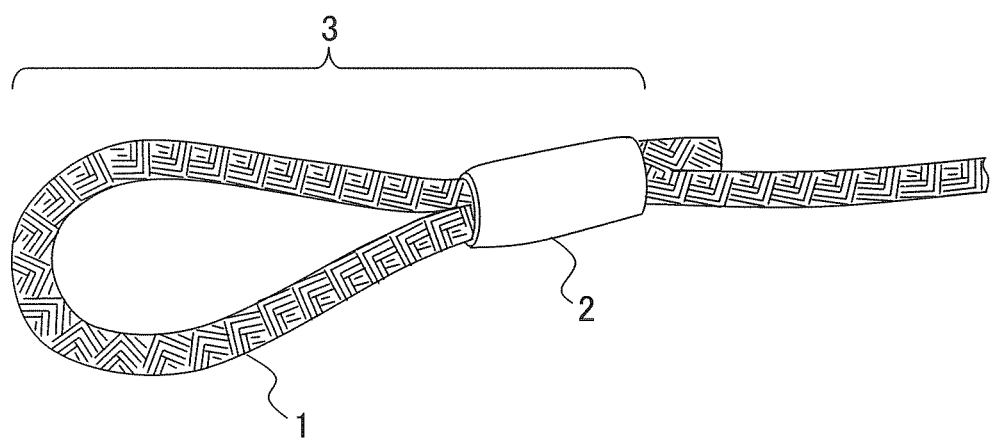
FIG. 3 shows a conceptual configuration where the terminal end portion of the synthetic fiber rope is made to have a loop shape by using a sleeve.

A rope member was produced in the same manner as in Example 1 except that a sleeve made of aluminum having an elliptical cross section (inner diameter of 8 mm (long diameter) and 4.5 mm (short diameter), length of 20 mm) was used as a clamping member, a terminal end portion of the synthetic fiber rope was folded back to form a loop shape as shown in FIG. 3, and overlapped portions of the synthetic fiber rope were inserted into the sleeve. The filler liquid was penetrated (permeated) into two portions of the rope member constructing the overlapped portions.

Example 4

A rope member was produced in the same manner as in Example 2 except that a sleeve made of aluminum having an elliptical cross section (inner diameter of 8 mm to 4.5 mm, length of 20 mm) was used as a clamping member, a terminal end portion of the synthetic fiber rope was folded back to form a loop shape as shown in FIG. 3, and overlapped portions of the synthetic fiber rope were inserted into the sleeve. The silica/ethanol dispersion liquid was penetrated into two portions of the rope member constructing the overlapped portions.

Example 5

Figure 4:
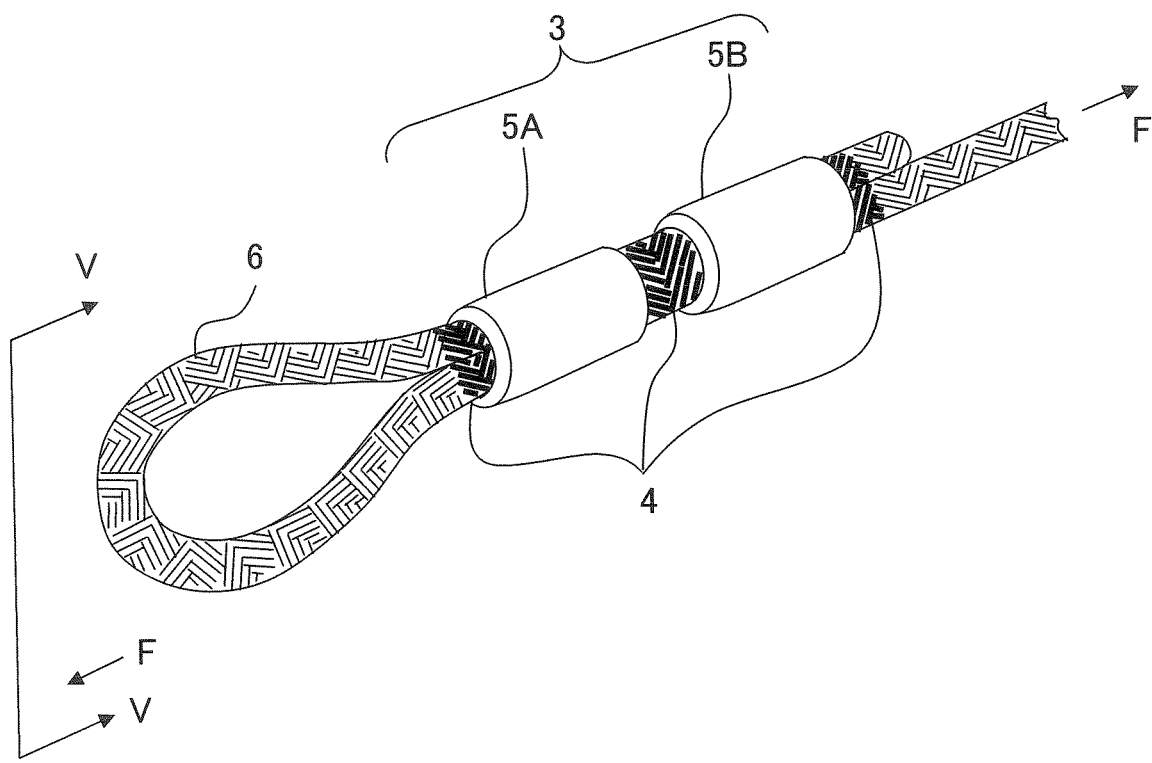
FIG. 4 shows a configuration in which a portion disposed in the vicinity of a terminal end portion of a synthetic fiber rope is caulked with two oval sleeves to form a loop shape, wherein the filler is made to penetrate into the terminal end portion.
Figure 5A:
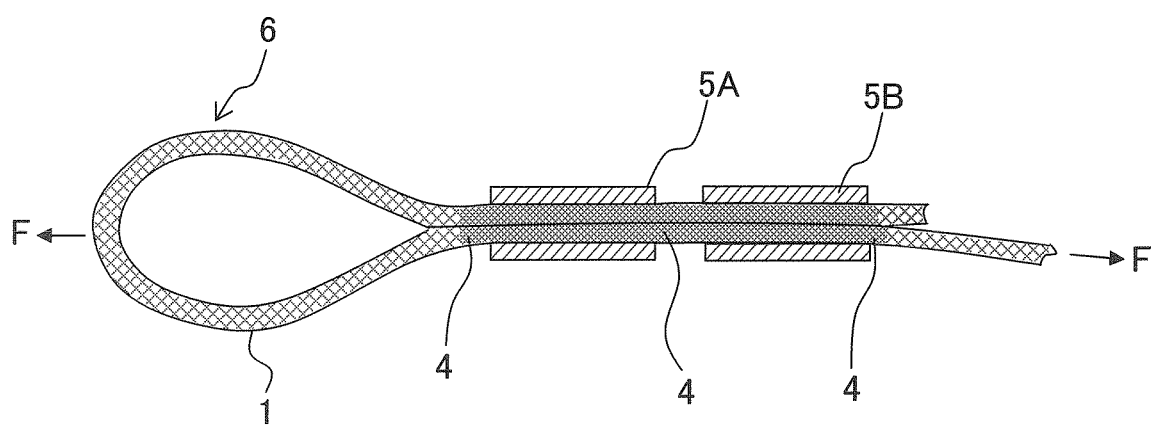
FIG. 5 (FIGS. 5A, 5B) shows a sectional view taken in a direction V-V, illustrating the synthetic fiber rope member shown in FIG. 4.
Figure 5B:
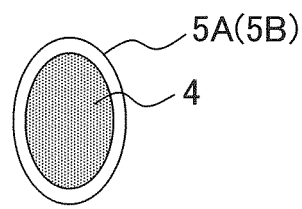
Figure 6:
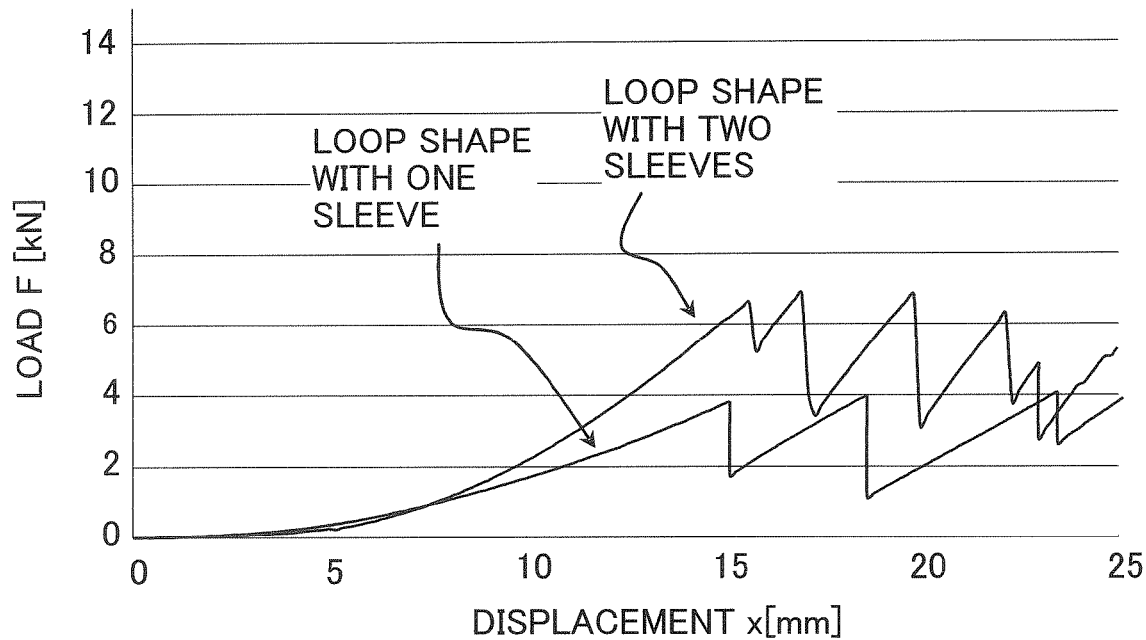
FIG. 6 shows a graph illustrating tensile strength test results of the synthetic fiber ropes in which the terminal end portions of the synthetic fiber ropes are made to have the loop shapes as shown in FIGS. 3 and 4.

A rope member was made in the same manner as in Example 3 except that a terminal end portion 3 of the synthetic fiber rope 1 was processed to form a loop shape 6 by using two sleeves 5A, 5S made of aluminum as shown in FIG. 4 and FIG. 5 (FIGS. 5A and 5B).

Example 6

A rope member was made in the same manner as in Example 4 except that a terminal end portion 3 of the synthetic fiber rope 1 was processed to form a loop shape 6 by using two sleeves 5A, 5B made of aluminum as shown in FIG. 4 and FIG. 5 (FIGS. 5A and 5B).

Example 7

A filler was prepared in the same manner as in Example 1 and a rope member was made in the same manner as in Example 6 except that a silica powder (average particle size: 0.8 μm) was mixed in ethanol at a volume ratio (ethanol: silica) of 7:3.

Example 8

A rope member was manufactured in the same manner as in Example 7 except that α-alumina ($Al_2O_3$) powder having an average particle size of about 1.0 μm and a purity of 99.9% was used as inorganic material particles and mixed in ethanol at a volume ratio (ethanol:α-alumina) of 67:33. As for the sleeves made of aluminum, those in which end portions thereof were subjected to the chamfering processing (test samples A1, A2) were also used together with those in which end portions thereof were not subjected to the chamfering processing (test samples A3, A4). This procedure was performed in order to confirm whether or not any burr remaining at the end portion of the sleeve made of aluminum affected the tensile strength.

Comparative Example 1

A rope member was manufactured in the same manner as in Example 5 except that the filler was not penetrated into the synthetic fiber rope 1.

Comparative Example 2

A rope member was manufactured in the same manner as in Example 5 except that silicone was used as a filler. Reactive hot-melt silicone (HM-2150 Assembly Sealant produced by Dow Corning) was used as silicone. This silicone has a silicone purity of 100%, and it has a low viscosity of 1050 poise at 120° C. A hot-melt gun was used to penetrate silicone into the synthetic fiber rope.

A tensile strength test was performed under the following condition by using a tensile test machine (Autograph produced by Shimadzu, maximum tensile force: 50 kN) for the rope members obtained in Examples 5 to 8 and Comparative Examples 1 and 2.

Holding tool: eye bolt, shackle;
Tensile velocity: V=10 mm/minute;
Reference length: L=not less than 450 mm.

In order to perform the tensile strength test, the sleeves were fixed to the both terminal end portions respectively so that loops were formed at the both terminal end portions of the rope member respectively.

Figure 7:
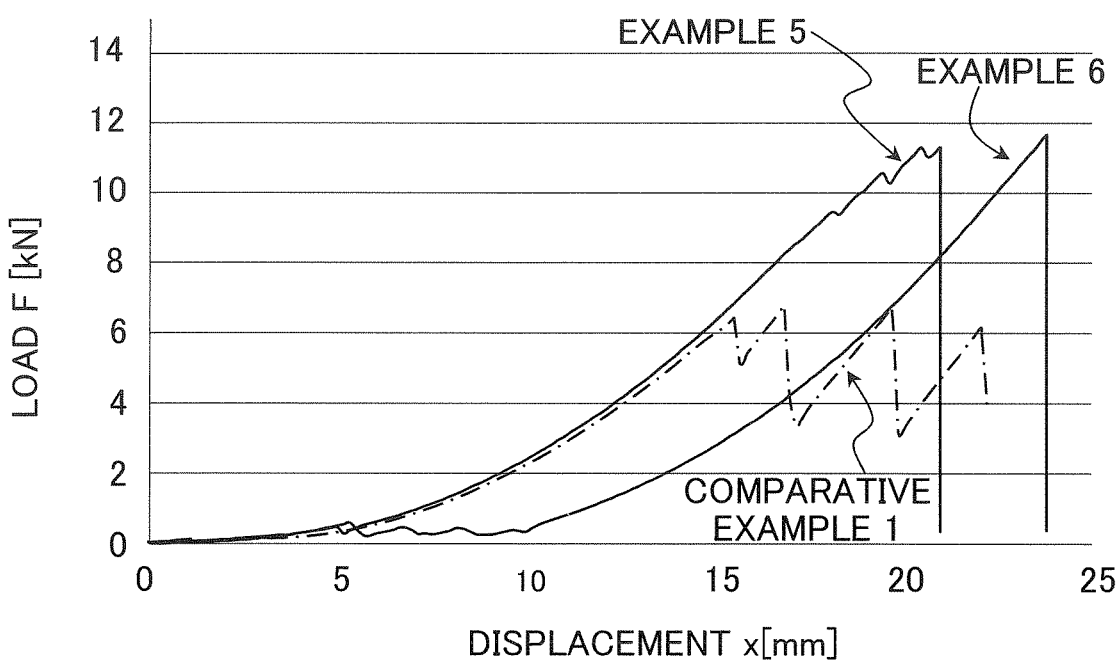
FIG. 7 shows a graph illustrating tensile strength test results of synthetic fiber rope members made in Examples 5 and 6 and Comparative Example 1.

FIG. 7 shows experimental results of Examples 5 and 6 and Comparative Example 1. The slippage is repeatedly occurred at a load of about 7 kN in the rope member prepared in accordance with the conventional method without using the filler. On the other hand, the slippage does not occur until the load arrives at about 11 kN in the rope member of Example 5 in which the filler charged with the silica particles is used. Further, the slippage does not occur until the load arrives at about 12 kN in the rope member in which the filler charged with the silica particles is penetrated and the alkyl α-cyanoacrylate-based adhesive is further permeated. It is clearly seen from the experiments that the effective coefficient of static friction μ of the expression (1) described above seems to be increased about by 1.5 times with the inorganic material particles (filler containing the same) permeated into the synthetic fiber rope in accordance with the method disclosed by the present invention. Accordingly, it is clearly understood that the effective maximum tensile force can be greatly improved when the synthetic fiber rope is used for an actual machine.

Figure 9:
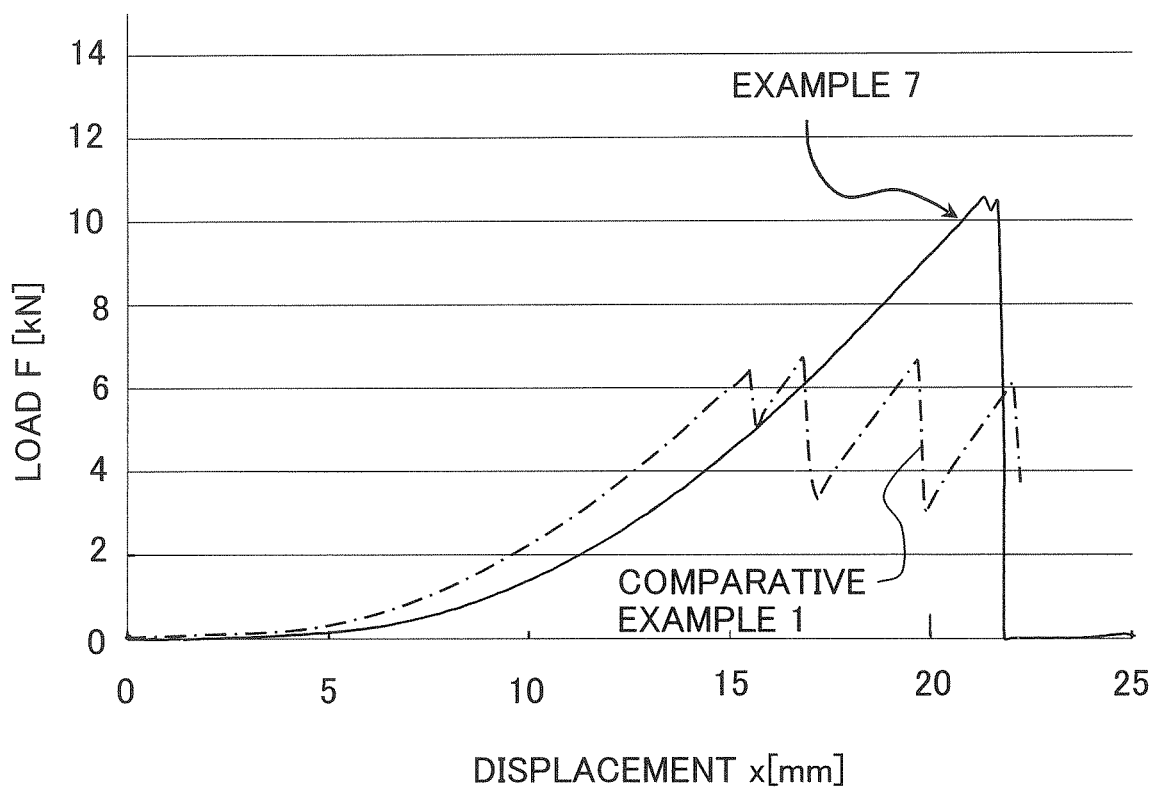
FIG. 9 shows a graph illustrating tensile strength test results of synthetic fiber rope members made in Example 7 and Comparative Example 1.

FIG. 9 shows experimental results of Example 7 and Comparative Example 1. The slippage does not occur until the load arrives at about 10.5 kN in the rope member of Example 7 using the filler in which the blending amount of silica is changed to 30%. Taking the result of Example 7 into consideration, it is understood that the load resistance exceeding 10 kN is exhibited when the blending amount of silica is within a range of 30 to 50% in the filler containing ethanol as the dispersion medium (permeating agent).

Figure 10:
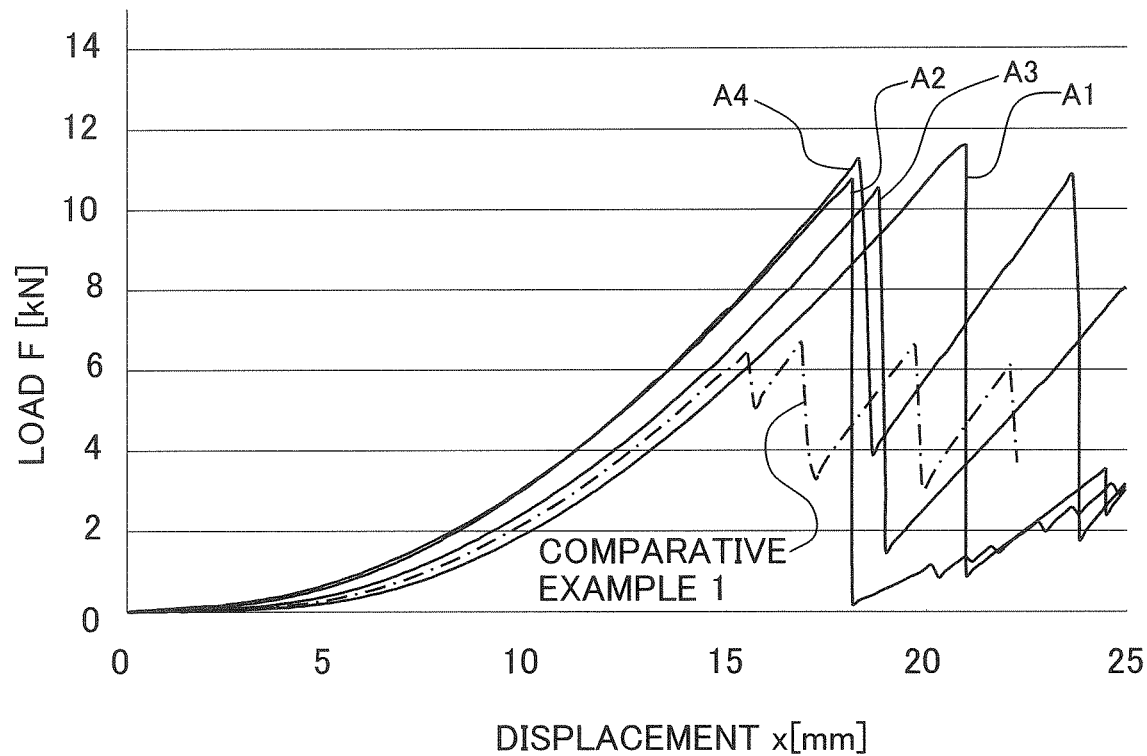
FIG. 10 shows a graph illustrating tensile strength test results of synthetic fiber rope members made in Example 8 and Comparative Example 1.

FIG. 10 shows experimental results of Example 8 and Comparative Example 1. The slippage does not occur until the load arrives at about 11 kN in the rope member of Example 8 using the filler in which the α-alumina particles are charged (used). Furthermore, when the α-alumina particles are used as the filler, a good load resistance is exhibited, similar to that obtained with silica. It is understood that the effective maximum tensile force can be greatly improved when the synthetic fiber rope charged with the α-alumina particles is used for an actual machine. No difference appeared in the load resistance between the test samples in which the end portion of the sleeve made of aluminum was subjected to the chamfering processing and the test samples in which the end portion of the sleeve made of aluminum was not subjected to the chamfering processing.

Figure 11:
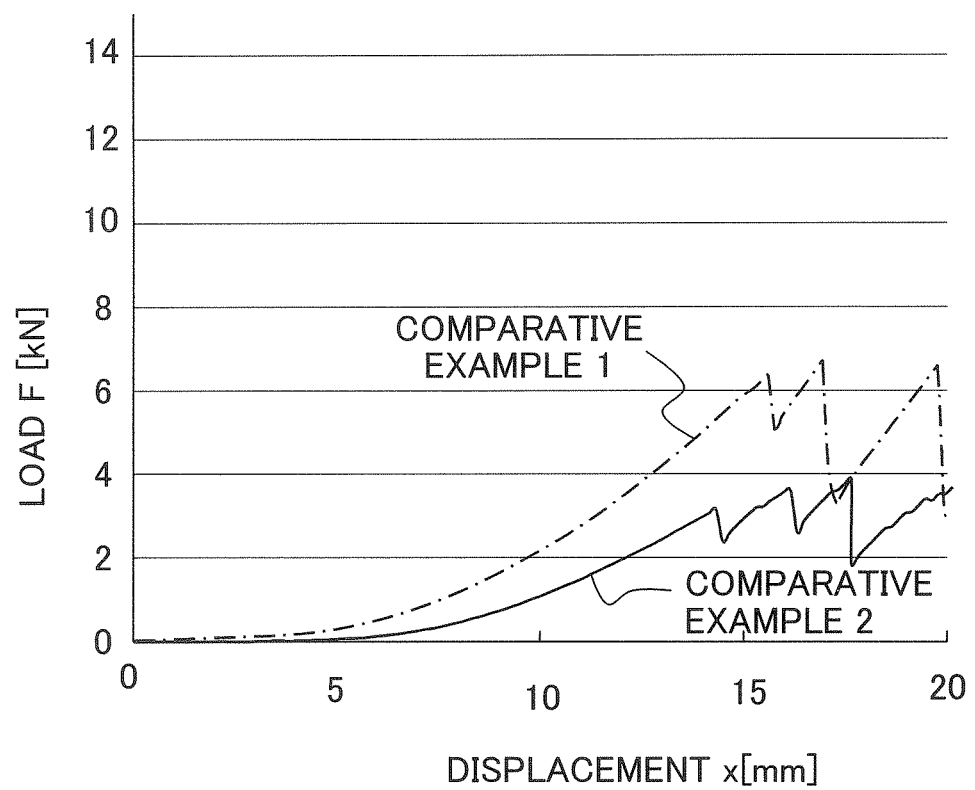
FIG. 11 shows a graph illustrating tensile strength test results of synthetic fiber rope members made in Comparative Examples 1 and 2.

FIG. 11 shows experimental results of Comparative Examples 1 and 2. It is understood that the maximum load is lowered when silicone is used as the filler as compared with the case in which the filler is not used. According to the experimental results, it is understood that the permeative liquid, in which the particles of the inorganic material such as silica and alumina are dispersed, is very effective as the filler. Further, it is to be mentioned that the preparation process, in which the permeative liquid dispersed with the inorganic material particles is penetrated into the synthetic fiber rope as described above, is rather simple. Furthermore, the inorganic material is also preferred in view of the environment as compared with organic materials such as curable resins and the like. The outer appearance of the rope member of the present invention is not different at all from that of the rope member onto which the filler dispersed with the inorganic material particles is not coated, does not affect the usage of the rope member at all and does not impose any limitation to a member to which the rope member is connected and which includes, for example, connection portions of various devices or equipments such as an overhead door, a construction machine, etc.

An example of using the rope member of the present invention in an overhead door is shown in FIG. 12. An overhead door 20 is provided to open/close an opening 32 of a building or architecture such as a garage 30. The overhead door 20 mainly includes a sectional door 10 which has several sections and which closes the opening 32; rollers 14 which are rotatably attached to a side portion of the sectional door 10; a guide rail 22 which extends from the floor in an inverted L-shaped form and along which the rollers 14 slidably move; and a drum 26 which is arranged at a position above or over the sectional door 10 in a closing state, and to which a wire 24 attached and fixed to the lower end portion of the sectional door 10 is wound. In order to open or release the overhead door 20, for example, the drum 26 is rotated by an electric mechanism to pull the wire 24 upward. By this pull-up operation, the rollers 14 run along the guide rail 22 to uplift the sectional door 10, and the sectional door 10 is moved as shown in FIG. 12 until the sectional door 10 finally is accommodated in parallel to the ceiling of the garage 30. The wire 24 is formed of a synthetic fiber rope, in accordance with Example 6, and the terminal end portion of the synthetic fiber rope is made to form a loop shape 6 by using two sleeves 5A, 5B made of aluminum. The terminal end portion which is formed to have the loop shape is connected to an engaging portion 28 disposed at the lower end portion of the sectional door 10. If any slippage occurs between the sleeves 5A, 5B and the wire 24, there is a possibility that the sectional door 10 might fall or drop along the guide rail 22. However, since the wire 24 is formed in accordance with the present invention, such slippage is effectively prevented. In addition, because it is possible to use the existing products or materials for the sleeves 5A, 5B and the wire 24, the outer size (outer dimension) of the wire 24 is not different from that of any conventional product or material. Therefore, it is possible to attach the wire 24 to an overhead door 20 already in use and/or to replace the existing wire by the wire 24 without affecting the open/close operation of the overhead door 20 at all. The overhead door 20 with the rope member of the present invention has excellent durability, enhanced safety and a compact structure which in turn enables the overhead door 20 to be easily attached to the building such as garage.

Although the present invention has been specifically explained in accordance with Examples, the present invention is not limited thereto. In the embodiments or Examples described above, the synthetic fiber rope is in the wire form having circular cross section, but can be in band-shape or tape-shape. The clamping member can be appropriately changed depending on the cross-sectional shape of the synthetic fiber rope.

The synthetic fiber rope member of the present invention is suitable for various ways of use in relation to a structure to which the high load is applied, including, for example, construction machines such as cranes, buildings and structures such as suspension bridges, and hoisting accessories such as those used for garage doors and overhead doors for the industry use and for the housing equipment. Among the synthetic fiber ropes, in particular, a rope made of the polyarylate fiber such as Vectran is known to have a tensile strength which is increased as temperature is lowered in a low-temperature range from 0° C. to −50° C. Therefore, the rope member according to the present invention using the polyarylate fiber can be suitably used for opening/closing an insulation door, to which the high load is applied, of a refrigerator including those used in chilled and frozen temperature ranges.

What is claimed is:

1. A method for producing a rope member provided with a rope of a bundle of synthetic fibers and a clamping member fixed to the rope and forming a portion with which the rope is to be connected or fastened to an external member, the method comprising:
    making a filler permeate into a part of the rope, the filler having a permeability to the rope and containing a liquid and particles of an inorganic material dispersed in the liquid,
        wherein particle size of the particles of the inorganic material is from 0.5 μm to 2.0 μM;
    evaporating the liquid from the rope; and
    fixing the clamping member to the rope by installing the clamping member so as to cover the part, of the rope, permeated with the filler and by applying pressure to a side surface of the clamping member to tighten the clamping member.

2. The method according to claim 1, wherein the inorganic material is silica or alumina.

3. The method according to claim 1, wherein the liquid is ethanol.

4. The method according to claim 1, wherein the clamping member is a metal sleeve.

5. The method according to claim 1, wherein a terminal end portion of the rope is folded back into a loop shape having overlapping portions, the filler is penetrated into the overlapped portions of the rope, the clamping member is installed to cover the overlapped portions of the rope permeated with the filler, and the clamping member is tightened.

6. The method according to claim 1, wherein the rope, formed of the bundle of synthetic fibers, has a tensile strength of not less than 250 kgf/mm$^2$.

7. The method according to claim 6, wherein the synthetic fiber is a polyarylate fiber.

8. A rope member produced by the method as defined in claim 1.

9. A rope member comprising:

a rope formed by twisting synthetic fibers; and a clamping member tightened under pressure to the rope and forming a portion with which the rope is to be connected or fastened to an external member, wherein spaces between the twisted synthetic fibers, disposed at a portion of the rope at which the clamping member is attached, are filled with only particles of an inorganic material, and wherein particle size of the particles of the inorganic material is from 0.5 µm to 2.0 µm.

10. The rope member according to claim 9, wherein the inorganic material is silica or alumina.

11. The rope member according to claim 9, wherein the rope, formed of a bundle of the synthetic fibers, has a tensile strength of not less than 250 kgf/mm$^2$.

12. The rope member according to claim 11, wherein the synthetic fibers are polyarylate fibers.

13. An overhead door comprising the rope member as defined in claim 9; and a door to which an end portion of the rope member is attached.

\* \* \* \* \*